United States Patent
Vacek et al.

(10) Patent No.: US 6,862,343 B1
(45) Date of Patent: Mar. 1, 2005

(54) METHODS, APPARATUS, SCRIPTS, AND COMPUTER READABLE MEDIA FOR FACILITATING SECURE CAPTURE OF SENSITIVE DATA FOR A VOICE-BASED TRANSACTION CONDUCTED OVER A TELECOMMUNICATIONS NETWORK

(75) Inventors: Jill M. Vacek, Blair, NE (US); Mark J. Pettay, Omaha, NE (US); Hendryanto Rilantono, Omaha, NE (US); Mahmood S. Akhwand, Omaha, NE (US)

(73) Assignee: West Corporation, Omaha, NE (US)

( * ) Notice: Subject to any disclaimer, the term of this patent is extended or adjusted under 35 U.S.C. 154(b) by 135 days.

(21) Appl. No.: 10/156,575

(22) Filed: May 28, 2002

Related U.S. Application Data

(63) Continuation of application No. 10/108,224, filed on Mar. 27, 2002, now abandoned.

(51) Int. Cl.$^7$ ................................................. H04M 1/64
(52) U.S. Cl. ................................. 379/88.22; 379/266.1
(58) Field of Search ..................... 379/67.1, 85, 88.22, 379/88.26, 265.01, 266.09, 266.1

(56) References Cited

U.S. PATENT DOCUMENTS

| | | | |
|---|---|---|---|
| 4,792,968 | A | 12/1988 | Katz |
| 4,845,739 | A | 7/1989 | Katz |
| 4,930,150 | A | 5/1990 | Katz |
| 4,932,046 | A | 6/1990 | Katz et al. |
| 4,939,773 | A | 7/1990 | Katz |
| 4,975,945 | A | 12/1990 | Carbullido |
| 4,987,590 | A | 1/1991 | Katz |
| 4,989,233 | A * | 1/1991 | Schakowsky et al. ..... 379/92.03 |

(List continued on next page.)

OTHER PUBLICATIONS

U.S. Patent Office Recognizes New Multifunction Telecommunications Technology, Business Wire, Inc., Jun. 6, 1989.

PriceInteractive Launches Most Reliable Anti–Slamming Service New Enhanced Third Party Vertification (TM) Solutions Cut Carrier Costs By More Than Half, PR Newswire via NewsEdge Corporation, Jul. 1, 1999.

VoiceLog, VoiceLog Announces Free Speech TPV –Speech Recognition–Based Verification At Touchtone Prices, Press Release, www.voicelog.com, Jan. 06, 2004.

VoiceLog, VoiceLog Offers Third Party Verification for Wireless Number Portability, Press Release, www.voicelog, com, Oct. 31, 2003.

VoiceLog, Bray Joins VoiceLog as Director of Live Operator Verification Services, Press Release, www.voicelog.com, Oct. 28, 2003.

(List continued on next page.)

*Primary Examiner*—Scott L. Weaver
(74) *Attorney, Agent, or Firm*—West Corporation; Rocco L. Adornato

(57) ABSTRACT

Methods, apparatus, scripts, and computer readable media for facilitating secure capture of sensitive data during a voice-based transaction with a caller conducted over a telecommunications network. In an illustrative embodiment, the method comprises executing a script controlling a flow for the voice-based transaction, during which transaction at least one of sensitive and non-sensitive data may be obtained. The caller is transferred to an automated system in real time in response to the script to capture sensitive data from the caller and to store the sensitive data in a transaction record. The caller is transferred to a live operator in real time in response to the script to capture non-sensitive data from the caller and to store the non-sensitive data in the transaction record. Apparatus, scripts, and computer readable media for realizing the above method and other embodiments of the same are also provided.

20 Claims, 5 Drawing Sheets

U.S. PATENT DOCUMENTS

| | | | |
|---|---|---|---|
| 5,014,298 A | 5/1991 | Katz | |
| 5,016,270 A | 5/1991 | Katz | |
| 5,018,191 A | 5/1991 | Catron et al. | |
| 5,048,075 A | 9/1991 | Katz | |
| 5,073,929 A | 12/1991 | Katz | |
| 5,091,933 A | 2/1992 | Katz | |
| 5,109,404 A | 4/1992 | Katz et al. | |
| 5,128,984 A | 7/1992 | Katz | |
| 5,179,585 A | 1/1993 | MacMillan, Jr. et al. | |
| 5,185,787 A | 2/1993 | Katz | |
| 5,218,631 A | 6/1993 | Katz | |
| 5,224,153 A | 6/1993 | Katz | |
| 5,239,462 A | 8/1993 | Jones et al. | |
| 5,251,252 A | 10/1993 | Katz | |
| 5,255,309 A | 10/1993 | Katz | |
| 5,259,023 A | 11/1993 | Katz | |
| 5,297,197 A | 3/1994 | Katz | |
| 5,299,260 A | 3/1994 | Shaio | |
| 5,311,572 A | 5/1994 | Friedes et al. | |
| 5,349,633 A | 9/1994 | Katz | |
| 5,351,285 A | 9/1994 | Katz | |
| 5,355,406 A | 10/1994 | Chencinski et al. | |
| 5,359,645 A | 10/1994 | Katz | |
| 5,365,575 A | 11/1994 | Katz | |
| 5,375,161 A | 12/1994 | Fuller et al. | |
| 5,442,688 A | 8/1995 | Katz | |
| 5,444,774 A | 8/1995 | Friedes | |
| 5,517,558 A | 5/1996 | Schalk | |
| 5,574,776 A | 11/1996 | Leuca et al. | |
| 5,594,784 A | 1/1997 | Velius | |
| 5,625,680 A | 4/1997 | Foladare et al. | |
| 5,634,086 A | 5/1997 | Rtischev et al. | |
| 5,666,157 A | 9/1997 | Aviv | |
| 5,675,637 A | 10/1997 | Szlam et al. | |
| 5,819,029 A | 10/1998 | Edwards | |
| 5,825,856 A * | 10/1998 | Porter et al. | 379/93.12 |
| 5,838,768 A | 11/1998 | Sumar | |
| 5,867,562 A | 2/1999 | Scherer | |
| 5,870,464 A | 2/1999 | Brewster et al. | |
| 5,872,834 A | 2/1999 | Teitelbaum | |
| 5,987,118 A | 11/1999 | Dickerman et al. | |
| 6,049,602 A | 4/2000 | Foladare et al. | |
| 6,058,303 A | 5/2000 | Astrom | |
| 6,070,241 A | 5/2000 | Edwards | |
| 6,094,476 A | 7/2000 | Hunt et al. | |
| 6,119,084 A | 9/2000 | Roberts et al. | |
| 6,144,938 A | 11/2000 | Surace | |
| 6,266,640 B1 | 7/2001 | Fromm | |
| 6,275,940 B1 | 8/2001 | Edwards | |
| 6,320,956 B1 | 11/2001 | Cherry | |
| 6,359,971 B1 | 3/2002 | Haimi-Cohen | |
| 6,370,508 B2 | 4/2002 | Beck | |
| 6,401,066 B1 | 6/2002 | McIntosh | |
| 6,493,446 B1 | 12/2002 | Cherry | |
| 6,501,956 B1 | 12/2002 | Weeren | |
| 6,604,075 B1 | 8/2003 | Brown | |
| 6,650,736 B1 | 11/2003 | Unger | |
| 6,738,740 B1 * | 5/2004 | Barash | |

OTHER PUBLICATIONS

VoiceLog, VoiceLog Offers Sarbanes–Oxley Employee Hotline Solution, Press Release, www.voicelog.com, Oct. 07, 2003.

VoiceLog, VoiceLog Makes INC 500 List of Fastest–Growing Private Companies Second Straight Year, Press Release, www.voicelog.com, Oct. 03, 2003.

VoiceLog, VoiceVerified Helps Telemarketers Meet New FTC Sales Rule, Press Release, www.voicelog.com, May 01, 2003.

VoiceLog, VoiceLog Scores A Win For Telecom Industry Against "Drop–Off" Rule Seeks Partners for Potential Suit Against FCC to Overturn, Press Release, www.voicelog.com, Mar. 27, 2003.

VoiceLog, VoiceLog Helps Telemarketers Meet New Telephone Sales Rule by Mar. 31 Deadline, No Need to Make Captial Investment to Record Telemarketing Sales, Press Release, www.voicelog.com, Mar. 12, 2003.

VoiceLog, VoiceLog Passes Half–Million Mark for Live Operator Verification Services Adds New Features and Functionality, Press Release, www.voicelog.com, Feb. 24, 2003.

VoiceLog, VoiceLog Ranked 77th in Inc Magazine's "Inc 500" for 2002, Press Release, www.voicelog.com, Oct. 15, 2002.

VoiceLog, VoiceLog Appoints Karl Erickson As Chief Technology Officer, Press Release, www.voicelog.com, Oct. 07, 2002.

VoiceLog, VoiceLog Announces "Verifiably Able" New Program Offers Meaningful Employment to Physically Challenged, Press Release, www.voicelog.com, May 28, 2002.

VoiceLog, VoiceLog Announces New Operations Center Added Location Provides Additional Capacity, Redundancy, Reliability, Press Release, www.voicelog.com, Mar. 01, 2002.

VoiceLog, VoiceLog Announces Live Operator Third Party Verification, Press Release, www.voicelog.com, May 01, 2001.

VoiceLog, VoiceLog Announces Package for New FCC Rules, Press Release, www.voicelog.com, Jan. 30, 2001.

VoiceLog, VoiceLog and TSS AG (Switzerland) Bring Third Party Verification to Europe, Press Release, www.voicelog.com, Jan. 17, 2001.

VoiceLog, VoiceLog Announces Voice Recognition for Third Party Verifications, Press Release, www.voicelog.com, Nov. 04, 1997.

VoiceLog, VoiceLog Announces Winter Weather Insurance For Third Party Verifications, Press Release, www.voicelog.com, Oct. 31, 1997.

VoiceLog, VoiceLog Guarantees Third Party Verification Compliance, Press Release, www.voicelog.com, Sep. 23, 1997.

VoiceLog, California Leads the Nation in Slamming Control, Press Release, www.voicelog.com, Mar. 27, 1998.

VoiceLog, VoiceLog Announces CPNI Verification Products, Press Release, www.voicelog.com, Mar. 04, 1998.

VoiceLog, VoiceLog's 50 State "Anti–Slamming Rules Report" Available on the Internet, Press Release, www.voicelog.com, Feb. 04, 1998.

VoiceLog, VoiceLog Announces Cost Effective Verification for Electric Service, Press Release, www.voicelog.com, Jan. 06, 1998.

VoiceLog, VoiceLog Reaches 100 Accounts in 1997, Press Release, www.voicelog.com, Jan. 02, 1998.

VoiceLog, VoiceLog and Telecommunications On Demand Announce Distribution Agreement, Press Release, www.voicelog.com, Nov. 12, 1997.

VoiceLog, VoiceLog Offers Industry–Wide Solution to "Cramming", Press Release, www.voicelog.com, Apr. 21, 1998.

VoiceLog, VoiceLog Third Party Verification Release Free Analysis of New FCC Anti–Slamming Rules, Press Release, www.voicelog.com, Feb. 09, 1999.

VoiceLog, VoiceLog Meets Anti–Slamming Rules for E–Commerce Internet Orders, Press Release, www.voicelog, com, Jan. 27, 1999.

VoiceLog, VoiceLog Announces "Quick Freeze" *The New Third Party Verification Program for Carrier Freezes* to Meet the FCC Anti–Slamming Rules, Press Release, www.voicelog, com, Jan. 12, 1998.

VoiceLog, VoiceLog Closes 1998 With Two Million Third Party Verification Transactions—Now the Leader in Preventing Slamming, Press Release, www.voicelog, com, Jan. 30, 1998.

VoiceLog, VoiceLog Third Party Verification Helps Telecommunications Industry Meet New FCC Anti–Slamming Rules, Press Release, www.voicelog, com, Dec. 20, 1998.

VoiceLog, VoiceLog Is First Choice for Third Party Verification, Press Release, www.voicelog, com, Aug. 10, 1998.

VoiceLog, Total Slamming Control—The Ultimate in Third Party Verification, Press Release, www.voicelog, com, May 11, 1998.

VoiceLog, VoiceLog Releases Study on State Attitudes Toward FCC Anti–Slamming Rules, Press Release, www.voicelog, com, Apr. 14, 1999.

VoiceLog, VoiceLog Third Party Verification Releases Updated Anti–Slamming Rules Report, Press Release, www.voicelog, com, Mar. 16, 1999.

VoiceLog, VoiceLog Announces Web Interface for Verification Retrievals and Audio Playback, Press Release, www.voicelog, com.

VoiceLog, VoiceLog Announces Dual Channel Recording, Press Release, www.voicelog, com, Jan. 04, 2000.

VoiceLog, VoiceLog Announces High Quality Name and Address Transcription, Press Release, www.voicelog, com, Feb. 01, 2000.

VoiceLog, VoiceLog Goes to the Ends of the Earth to Review Third Party Verification, Press Release, www.voicelog, com, Feb. 29, 2000.

VoiceLog, FCC Acknowledges Validity, Value of Automated Third Party Verification, Press Release, www.voicelog, com, Aug. 24, 2000.

VoiceLog, VoiceLog Announces True State–Specific Third Party Verification, Press Release, www.voicelog, com, May 09, 2000.

VoiceLog, VoiceLog Announces Easy Recording Download Function, Press Release, www.voicelog, com, Mar. 01, 2000.

VoiceLog, VoiceLog Announces Inbound That Delivers, Press Release, www.voicelog, com, Oct. 02, 2000.

* cited by examiner

METHODS, APPARATUS, SCRIPTS, AND COMPUTER READABLE MEDIA FOR FACILITATING SECURE CAPTURE OF SENSITIVE DATA FOR A VOICE-BASED TRANSACTION CONDUCTED OVER A TELECOMMUNICATIONS NETWORK

This application is a continuation of U.S. patent application Ser. No. 10/108,224, filed 27 Mar. 2002, now abandoned. The applicants claim the full benefit of the filing date of such application under 35 U.S.C. §120.

BRIEF DESCRIPTIONS OF THE DRAWINGS

DETAILED DESCRIPTION OF ILLUSTRATIVE EMBODIMENTS

Figure 1:
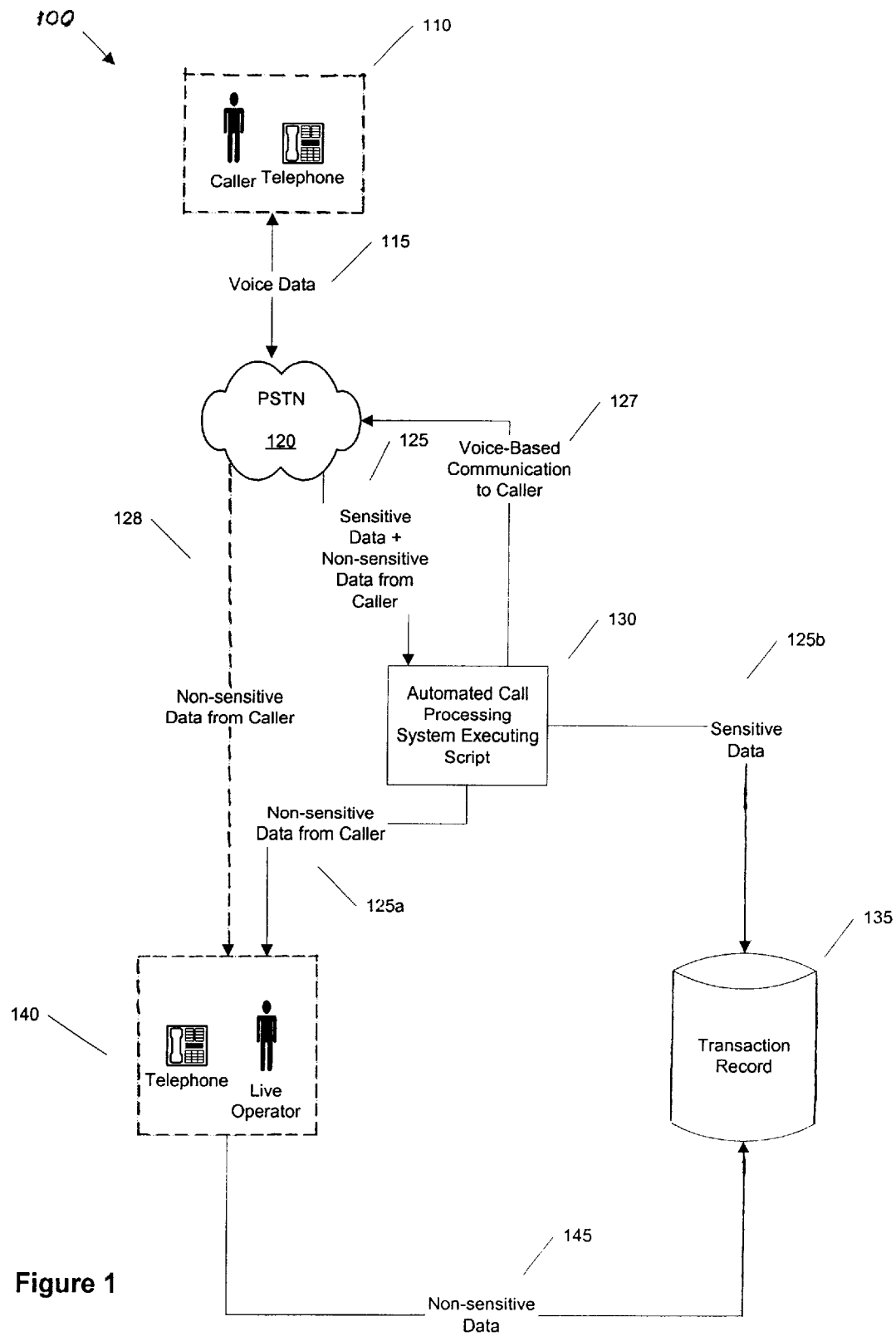
FIG. 1 is a block diagram of apparatus constructed according to an illustrative embodiment of the invention.

FIG. 1 is a block diagram of apparatus 100 constructed according to an illustrative embodiment of the invention. As shown in FIG. 1, a caller uses conventional telephone equipment, shown collectively as 110, to access the public switched telephone network (PSTN) 120 to exchange voice data 115 with a call processing center (not shown). The call center includes at least an automated call processing system 130 that executes a script specifying a call flow for the interaction with the caller 110.

It will be understood that either the call center or the caller 110 could initiate the voice-based interaction. For example, the caller 110 may dial a toll-free number serviced by the call center to order or inquire about goods or services marketed by a client of the call center. Conversely, the call center could initiate the call as part of an outbound telemarketing campaign. In either event, the caller 110 may enter into a transaction that involves disclosure of certain data pertaining to the caller 110.

The automated call processing system 130 is adapted to obtain both sensitive data and non-sensitive data (shown collectively as 125) from the caller 110. To receive any non-sensitive data 125a from the caller 110, the automated call processing system 130 transfers the caller 110 to a live operator 140, who may be physically located either on the premises of the call center or at a facility remote from the call center, such as the live operator's residence. From the standpoint of the caller 110, the call transfer performed by the automated call processing system 130 during the capture of non-sensitive data 125a is substantially transparent. In essence, the automated call processing system creates a virtual direct link 128 between the caller and the live operator, as indicated by the dashed line in FIG. 1 running from the PSTN 120 to the live operator 140.

When the script executing on the automated call processing system 130 indicates that sensitive data 125b is to be captured from the caller 110, the system 130 transfers the call from the live operator 140 back to itself. The caller 110 then provides the sensitive data 125b to the automated call processing system 130, which in turn stores the sensitive data 125 in a transaction record 135. Likewise, any non-sensitive data 125a obtained from the caller 110 by the live operator 140 is also stored in the transaction record 135.

In this manner, the telephone call from/to the caller 110 may be transferred between the live operator 140 and the automated call processing system 130, as dictated by the script executed by the automated call processing system 130, as many times and in whatever order is Hi necessary to capture both sensitive data 125b and non-sensitive data 125a from the caller 110. Preferably, this call transfer operation is conducted in real time, in that the caller 110 does not perceive a delay or other disturbance in the execution of these call transfers that is significant enough to unduly interfere with the overall call experience.

In the context of this specification, the term "sensitive data" refers to any data with which privacy concerns may be associated. Specific examples depend on the circumstances surrounding a given implementation of the invention, but may include telephone numbers, credit card or other banking institution numbers, social security numbers, drivers' licenses numbers, or the like.

The automated call processing system 130 is also adapted to generate voice communications directed to the caller 110, represented generally by the reference numeral 127, advising the caller 110 that any sensitive data 125b will be captured automatically rather than by the live operator 140, thereby minimizing the risk that the caller 110 might inadvertently provide sensitive information 125b directly to the live operator 140. Technology suitable to implement the automated call processing system 130 may include technology such as automated call distribution systems (ACDs), voice response units (VRUs), all switching and routing hardware, or interactive voice response units (IVRs), or combinations of the above. Further, the automated call processing system 130 may employ a speech recognition engine (not shown) if necessary to process the sensitive data 125b as received from the caller 110. The caller 110 may communicate sensitive data in at least two different ways. A first way would be to directly speak the sensitive data to the automated call processing system 130, in which case it may be necessary to convert such speech or voice data into a text equivalent for storage in the transaction record 135. Alternatively, the caller 110 may enter sensitive data 125b by using a touch-tone telephone handset equipped with technology suitable for generating DTMF tones. In this latter case, a speech recognition engine may not be necessary. Suitable speech recognition technology is available from Nuance Corporation (nuance.com). Those skilled in the art will recognize, however, that the invention is not limited to technology obtained from one particularly vendor, but could be practiced with technology obtained from any speech recognition vendor.

Figure 2:
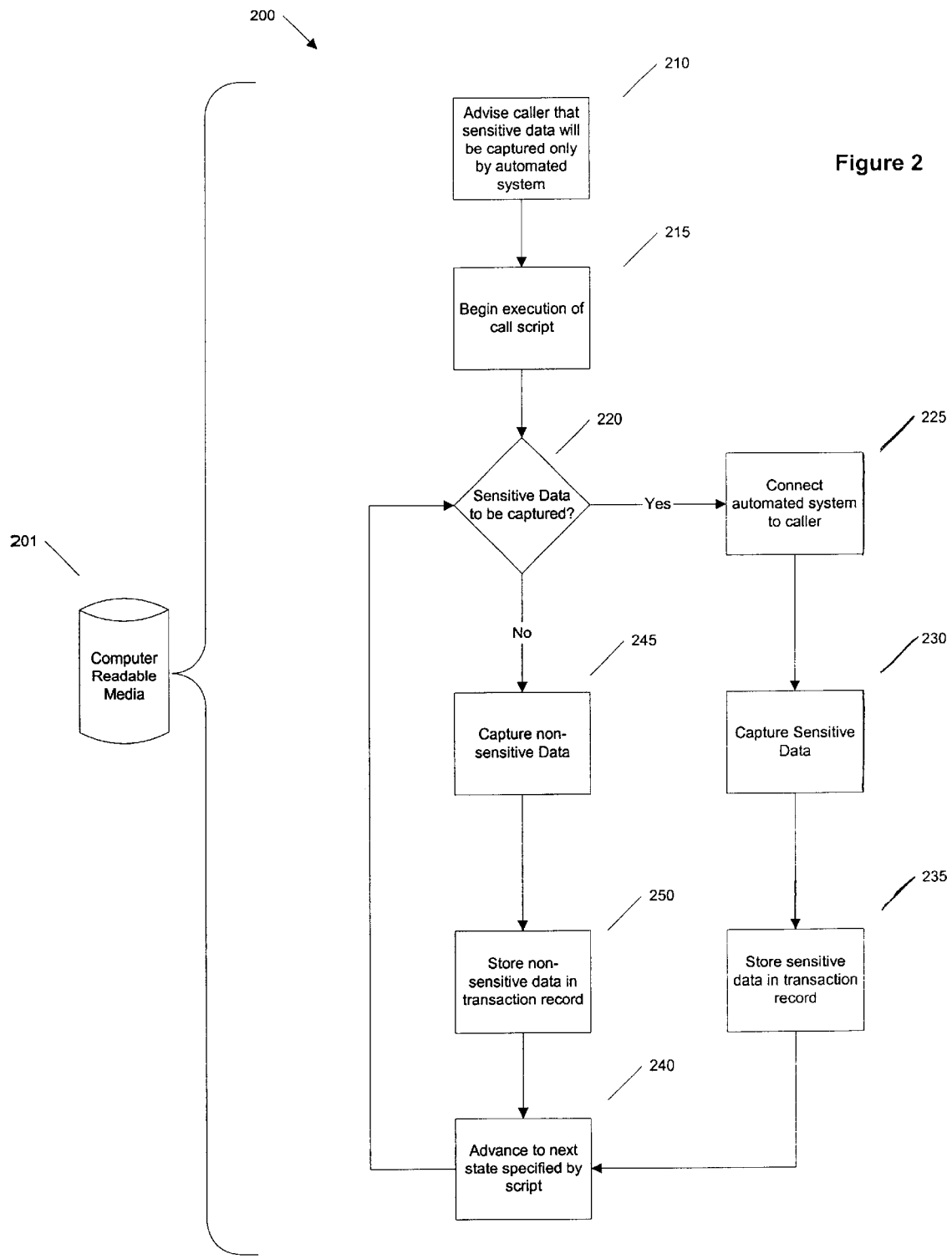
FIG. 2 is a flowchart of a process provided by an illustrative embodiment of the invention.

FIG. 2 is a flow chart of a process flow 200 provided by an illustrative embodiment of the invention. As shown by block 210, the method can include advising the caller that all sensitive data 125b will be captured only by the automated call processing system 130, and that any sensitive data 125b should not be provided to the live operator 140. In block 215, the method then begins execution of the call script running on the automated call processing system 130. In block 220, the method then evaluates whether sensitive data 125b is to be captured at a given point within the call script. If sensitive data 125b is to be captured at this given point, the method proceeds to transfer the caller 110 to the automated call processing system 130 to capture the sensitive data 125b. The automated call processing system 130 then captures the sensitive data 125b as necessary from the caller 110, as dictated by the script (block 230). The automated call processing system 130 then stores this sensitive data 125b in a transaction record 135 associated with the current transaction being executed with the caller 110 (block 235). The method then advances to the next state specified by the call script (block 240).

Returning to the evaluation block 220, if the given point in the call script indicates that sensitive data 125b is not to be captured at this point, the method proceeds to capture the nonsensitive data 125a as specified by the call script (block 245). The method then proceeds to store this non-sensitive data 125a in the transaction record 135 (block 250), and then the method advances to the next state specified by the script (block 240). The method then returns to the evaluation block 220 to continually evaluate whether sensitive data 125b is to be captured, and routes the telephone call accordingly. These steps are repeated until the call script is completely executed for a given interaction with a caller 110, or the communication with the caller 110 is terminated for some reason.

Figure 3A:
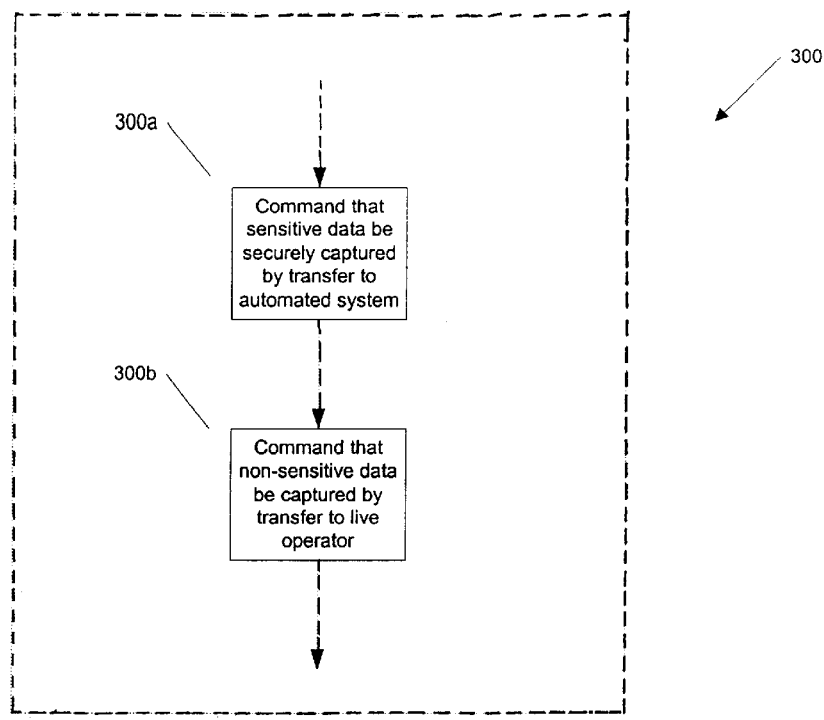
FIGS. 3a–3d illustrate various embodiments of a script constructed in accordance with various aspects of the invention.

FIGS. 3a–3d illustrate various embodiments of a script constructed in accordance with various aspects of the invention. FIG. 3a illustrates a first embodiment 300 of the script. A first command 300a appearing within the script dictates that sensitive data is to be captured from the caller 110, and that the call should be transferred to the automated call processing system 130 to capture that sensitive data. At a point later in the script, a command 300b dictates that nonsensitive data is to be captured from the caller 110 and that the call should be transferred to the live operator 140 to capture that non-sensitive data. The embodiment 300 of the script illustrates a scenario wherein sensitive data is captured automatically before the call is transferred to the live operator 140. Those skilled in the art will understand that various steps could precede command 300a, follow command 300b, or come in between commands 300a and 300b. These steps are not shown for the purposes of concise and brevity in illustrating the first command 300a and the second command 300b.

Figure 3B:
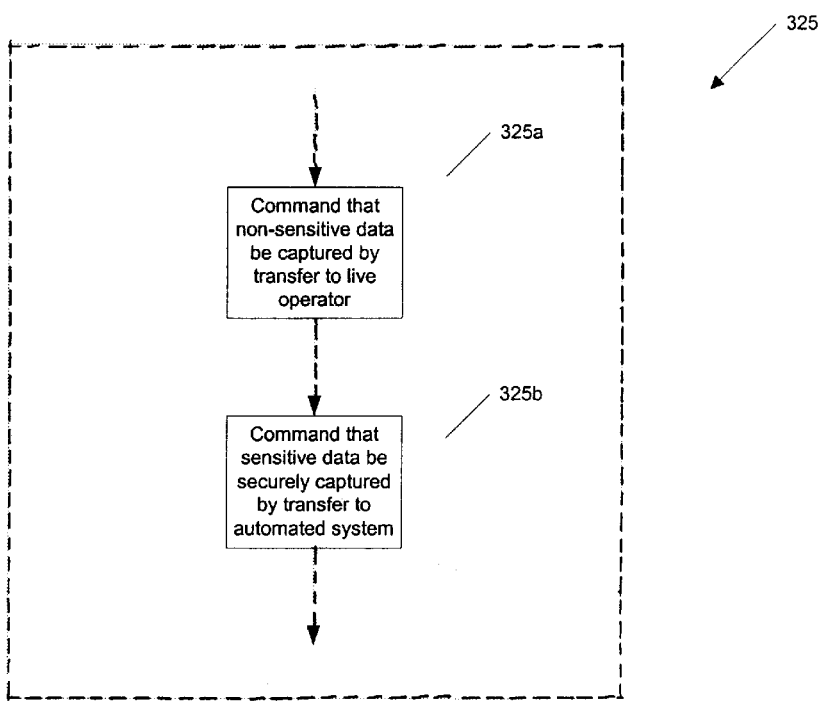

FIG. 3b illustrates an embodiment 325 of a script constructed in accordance to an illustrative embodiment of the invention. In this scenario, a first command 325a dictates that non-sensitive data be captured by the live operator 140, with a subsequent command 325b dictating that sensitive data be securely captured by the automated call processing system 130.

FIG. 3b illustrates a scenario wherein the non-sensitive data is captured first by the live operator 140, with sensitive data being captured subsequently by the automated call processing system 130.

Figure 3C:
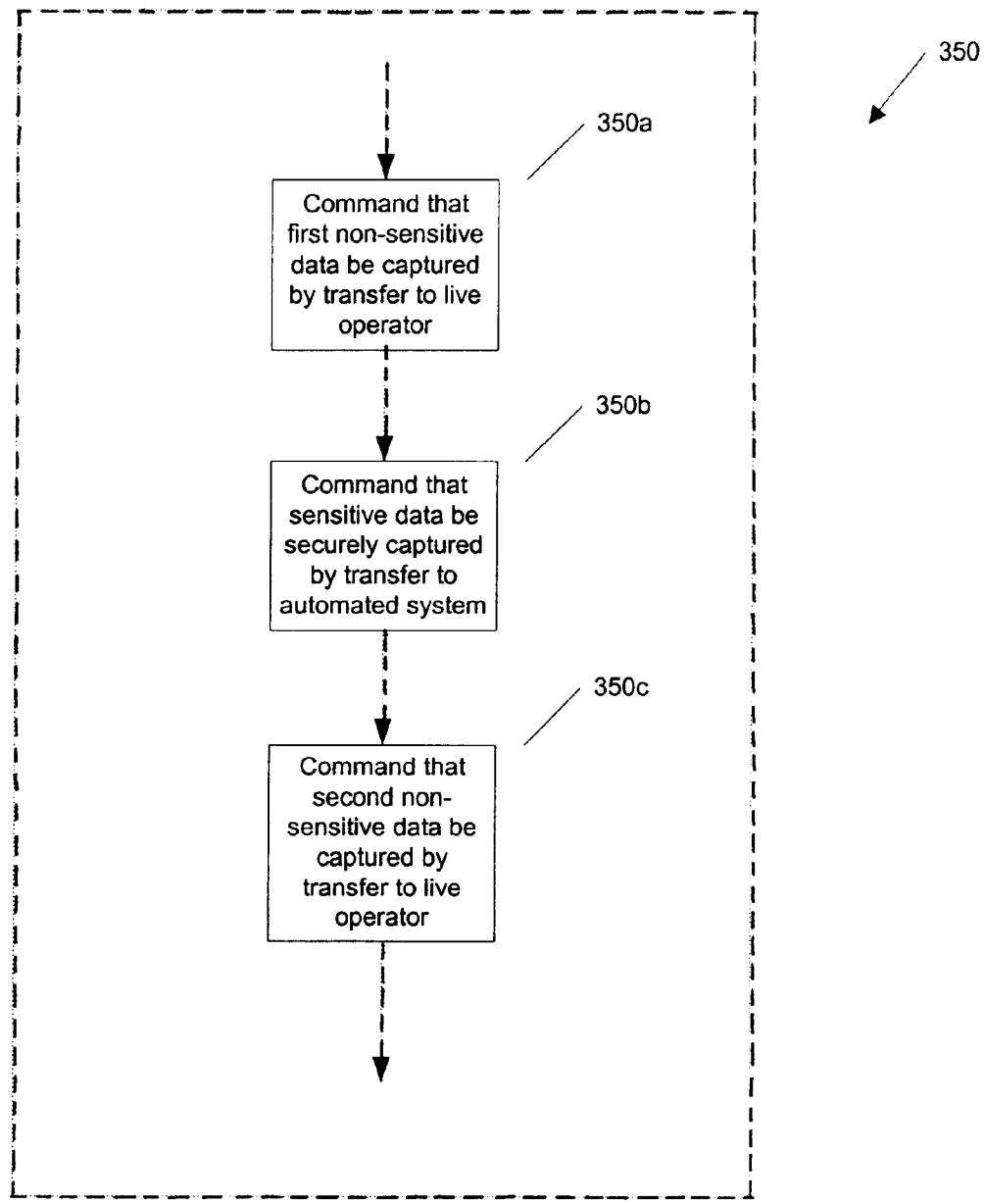

FIG. 3c illustrates an embodiment 350 of the script as constructed according to the invention. In this scenario, a first command 350a dictates that first non-sensitive data be captured by transferring the call to the live operator 140, with a subsequent command 350b dictating that sensitive data be securely captured by transferring the call to the automated call processing system 130, with a still further command 350c dictating that additional or second non-sensitive data be captured by retransferring the call to the live operator 140. The embodiment 350 illustrates a scenario wherein the call is repeatedly transferred between the live operator 140 and the automated call processing system 130 as necessary to capture both sensitive and non-sensitive data as dictated by the script 350.

Figure 3D:
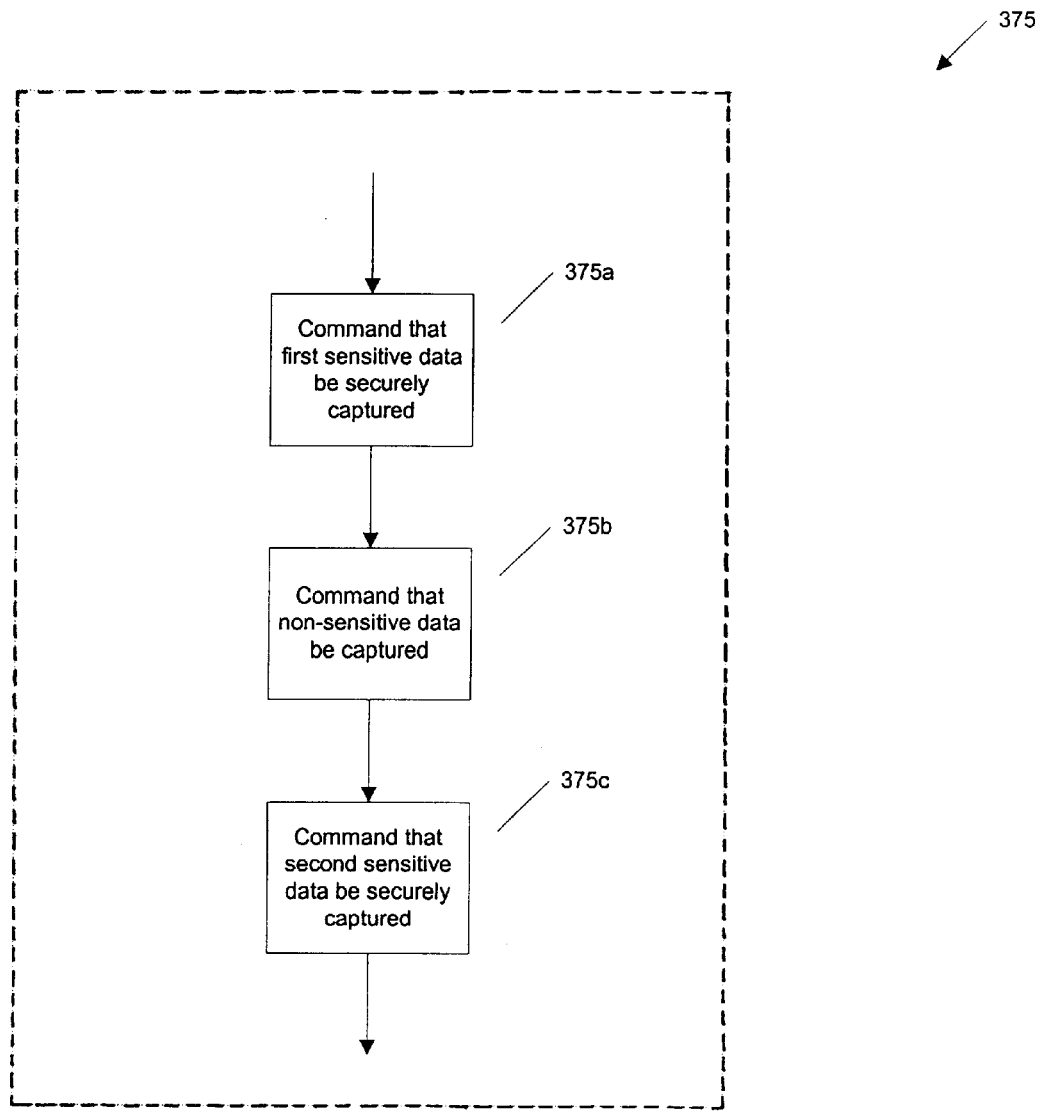

Similarly, the embodiment 375 shown in FIG. 3d illustrates a scenario wherein a command 375b to capture non-sensitive data is interposed between two commands 375a and 375c that dictate that first and second sensitive data is to be securely captured. Those skilled in the art will understand from reviewing the foregoing that the invention as discussed herein provides considerable flexibility and security in handling sensitive data as obtained from the caller 110.

Returning to FIG. 2, the program of instructions can be loaded and stored onto a program storage medium or device 201 readable by a computer or other machine, embodying a program of instructions executable by the machine to perform the various aspects of the method as discussed and claimed herein, and as illustrated in the Figures. Generally speaking, the program storage medium 201 can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 201 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides means for realizing the various functions, methods, and processes as described and claimed herein and as illustrated in the drawing figure attached hereto. Further, the various embodiments of the scripts (300, 325, 350, and 375) may also be embodied in or loaded onto program storage devices similar to that shown in FIG. 2 as 201.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

We claim:

1. A method of facilitating secure capture of sensitive data during a voice-based transaction with a caller conducted over a telecommunications network, the method comprising at least the following:

executing a script controlling a flow of the voice-based transaction, during which transaction at least one of sensitive and non-sensitive data may be obtained;

transferring the caller to an automated system in real time in response to the script to:
capture sensitive data from the caller; and
store the sensitive data in a transaction record;

transferring the caller to a live operator in real time in response to the script to:
capture non-sensitive data from the caller; and
store the non-sensitive data in the transaction record.

2. The method of claim 1, wherein transferring the caller to a live operator includes transferring the caller to a live operator physically located on the premises of a call center facility.

3. The method of claim 1, wherein transferring the caller to a live operator includes transferring the caller to a home agent who is located remotely from a call center.

4. The method of claim 1, further comprising converting the sensitive data to a text equivalent and storing the text equivalent in the transaction record.

5. The method of claim 1, wherein for at least one given transaction, transferring the caller to an automated system is performed before transferring the caller to a live operator.

6. The method of claim 1, wherein for at least one given transaction, transferring the caller to a live operator is performed before transferring the caller to an automated system.

7. The method of claim 1, wherein:
transferring the caller to an automated system includes transferring the caller to an automated system in response to a first portion of the script directing that sensitive data be captured from the caller; and
transferring the caller to an automated system includes transferring the caller to a live operator in response to at least a second portion of the script directing that non-sensitive data be captured from the caller.

8. The method of claim 1, wherein transferring the caller to an automated system and transferring the caller to an automated system to a live operator are both performed for the given voice-based transaction.

9. A program storage device storing a script that is adapted for execution in a call center environment to facilitate secure capture of sensitive data during a voice-based transaction conducted over a telecommunications network, the script comprising at least the following:
at least a one instance of a first command directing that sensitive data be securely captured by an automated system; and
at least a one instance of at least a second command directing that non-sensitive data be captured by a live operator.

10. The program storage device of claim 9, wherein the first command directs that a call be transferred in real time to the automated system to capture the sensitive data.

11. The program storage device of claim 9, wherein the at least second command directs that a call be transferred in real time to a live operator to capture the non-sensitive data.

12. The program storage device of claim 9, wherein the at least one instance of the first command appears sequentially in the script before the at least one instance of the second command.

13. The program storage device of claim 9, wherein the at least one instance of the at least second command appears sequentially in the script before the at least one instance of the first command.

14. The program storage device of claim 9, further comprising at least a second instance of the first command, and wherein the at least one instance of the at least second command appears sequentially between the first and at least second instances of the first command.

15. The program storage device of claim 9, further comprising at least a second instance of the at least second command, and wherein the at least one instance of the first command appears sequentially between the first and at least second instances of the second command.

16. The program storage device of claim 9, wherein:
the first command directs that a call be transferred in real time to the automated system to capture the sensitive data;
the at least second command directs that a call be transferred in real time to a live operator to capture the non-sensitive data; and
wherein both of the first command and the at least second command are executed at least once during the voice-based transaction.

17. Apparatus for facilitating secure capture of sensitive data during a voice-based transaction with a caller conducted over a telecommunications network, the apparatus comprising at least the following:
means for executing a script controlling a flow of the voice-based transaction, during which transaction at least one of sensitive and non-sensitive data may be obtained;
means for transferring the caller to an automated system in real time in response to the script to:
capture sensitive data from the caller; and
store the sensitive data in a transaction record;
means for transferring the caller to a live operator in real time in response to the script to:
capture non-sensitive data from the caller; and
store the non-sensitive data in the transaction record.

18. The apparatus of claim 17, wherein:
the means for transferring the caller to an automated system includes means for transferring the caller to an automated system in response to a first portion of the script directing that sensitive data be captured from the caller; and
the means for transferring the caller to an automated system includes means for transferring the caller to a live operator in response to at least a second portion of the script directing that non-sensitive data be captured from the caller.

19. A program storage device readable by a machine, tangibly embodying a program of instructions executable by the machine to perform a method for facilitating secure capture of sensitive data during a voice-based transaction with a caller conducted over a telecommunications network, the method comprising at least the following:
executing a script controlling a flow of the voice-based transaction, during which transaction at least one of sensitive and non-sensitive data may be obtained;
transferring the caller to an automated system in real time in response to the script to:
capture sensitive data from the caller; and
store the sensitive data in a transaction record;
transferring the caller to a live operator in real time in response to the script to:
capture non-sensitive data from the caller; and
store the non-sensitive data in the transaction record.

20. The method performed by the program of instructions embodied by the program storage device of claim 19, wherein:
transferring the caller to an automated system includes transferring the caller to an automated system in response to a first portion of the script directing that sensitive data be captured from the caller; and
transferring the caller to an automated system includes transferring the caller to a live operator in response to at least a second portion of the script directing that non-sensitive data be captured from the caller.

* * * * *